(12) United States Patent
Myers

(10) Patent No.: US 7,155,889 B2
(45) Date of Patent: Jan. 2, 2007

(54) MODULARIZED LAWNMOWER REPLACEMENT BLADE

(76) Inventor: Eric David Myers, 8505 Yashuntafun Rd., Tallahassee, FL (US) 32311

(*) Notice: Subject to any disclaimer, the term of this patent is extended or adjusted under 35 U.S.C. 154(b) by 6 days.

(21) Appl. No.: 11/127,724

(22) Filed: May 12, 2005

(65) Prior Publication Data

US 2006/0254243 A1    Nov. 16, 2006

(51) Int. Cl.
*A01D 34/52* (2006.01)
*A01D 34/73* (2006.01)

(52) U.S. Cl. .......................... 56/295; 56/255

(58) Field of Classification Search ............ 56/295, 56/255; 30/347
See application file for complete search history.

(56) References Cited

U.S. PATENT DOCUMENTS

| | | | | |
|---|---|---|---|---|
| 3,247,656 A | * | 4/1966 | Phelps | 56/295 |
| 3,430,461 A | * | 3/1969 | Boylan | 464/32 |
| 4,011,019 A | * | 3/1977 | McDonald et al. | 403/15 |
| 4,815,264 A | * | 3/1989 | Mijnders | 56/295 |
| 5,430,943 A | * | 7/1995 | Lee | 30/347 |
| 5,640,836 A | * | 6/1997 | Lingerfelt | 56/255 |
| 6,112,416 A | * | 9/2000 | Bridges et al. | 30/276 |
| 6,427,341 B1 | * | 8/2002 | Lee | 30/347 |

* cited by examiner

*Primary Examiner*—Árpád Fábián Kovács
(74) *Attorney, Agent, or Firm*—John Wiley Horton

(57) ABSTRACT

A modularized lawnmower replacement blade which can be can be attached to a standard lawnmower shaft. The modularized blade includes a central mounting hub with four recessed seats. In the preferred embodiment, a cutting blade is attached to each recessed seat so that the blades are positioned at a right-angled orientation with respect to each other.

13 Claims, 6 Drawing Sheets

MODULARIZED LAWNMOWER REPLACEMENT BLADE

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of lawnmowers. More specifically, the invention comprises a modularized replacement blade which can be attached to a conventional lawnmower shaft.

2. Description of the Related Art

The overall design of the gas-powered and electric-powered lawnmower cutting system has remained unchanged in recent decades. The overall design uses an electric or gas motor to turn a shaft which extends in the direction of the ground beneath the motor. The shaft extends through a hole into the blade housing where a blade is attached to the shaft. The motor drives the shaft causing angular rotation of the blade within the housing. Grass that extends above the height of the blade is cut and discharged from the housing.

Various lawnmower replacement blades are known in the art. The designs of the replacements blades vary significantly and have been the subject of many U.S. patents. Although great efforts have been made to improve the design of replacement lawnmower blades, these designs have their shortcomings.

As an example, most commercially available blades are ineffective at neatly cutting grass when the grass is wet, tall, or thick. The rotation of a conventional blade slows down under these conditions as the lawn provides greater resistance to cutting. This resistance can often escalate as the rotation of the cutting blade continues to slow until the blade eventually stops. The escalation of resistance occurs because, as the blade slows down, the force at which the cut grass is ejected decreases. This results in the accumulation of cut grass in the housing which increases the force required to turn the blade.

Even under ideal cutting conditions, conventional blades are ineffective at "cutting" the grass. As a conventional blade begins to dull, more grass is "torn" than "cut." As the blade strikes the grass, some of the grass is pulled by the blade until it breaks. This "tearing" of the grass results in increased cellular damage to the grass. This often causes the tip of the blade of grass to appear brown. It has also been noted that the increased cellular damage causes the grass to grow more quickly which requires more frequent mowing.

It is therefore desirable to provide a replacement lawnmower blade that is more effective at cutting grass when the grass is wet, tall, or thick. It is also desirable to provide a replacement lawnmower blade which will cut the grass without producing excessive cellular damage of the grass blades.

BRIEF SUMMARY OF THE INVENTION

The present invention is a modularized lawnmower replacement blade which can be can be attached to a standard lawnmower shaft. The modularized blade includes a central disk with four recessed seats. In the preferred embodiment, a cutting blade is attached to each recessed seat so that the blades are positioned at a right-angled orientation with respect to each other.

| 10 | modularized replacement blade | 12 | cutting blade |
|----|-------------------------------|----|---------------|
| 14 | mounting hub                  | 16 | bolts         |
| 18 | mounting bore                 | 20 | center portion |
| 22 | corner wedge                  | 24 | bolt holes    |
| 26 | recessed seat                 | 28 | side mating edge |
| 30 | back mating edge              | 32 | bottom        |
| 34 | bolt holes                    | 36 | cutting edge  |
| 38 | side edge                     | 40 | back edge     |
| 42 | offset                        | 44 | offset        |
| 46 | recessed seat                 | 48 | recessed seat |
| 50 | cutting end                   | 52 | attaching end |

DETAILED DESCRIPTION OF THE INVENTION

Figure 1:
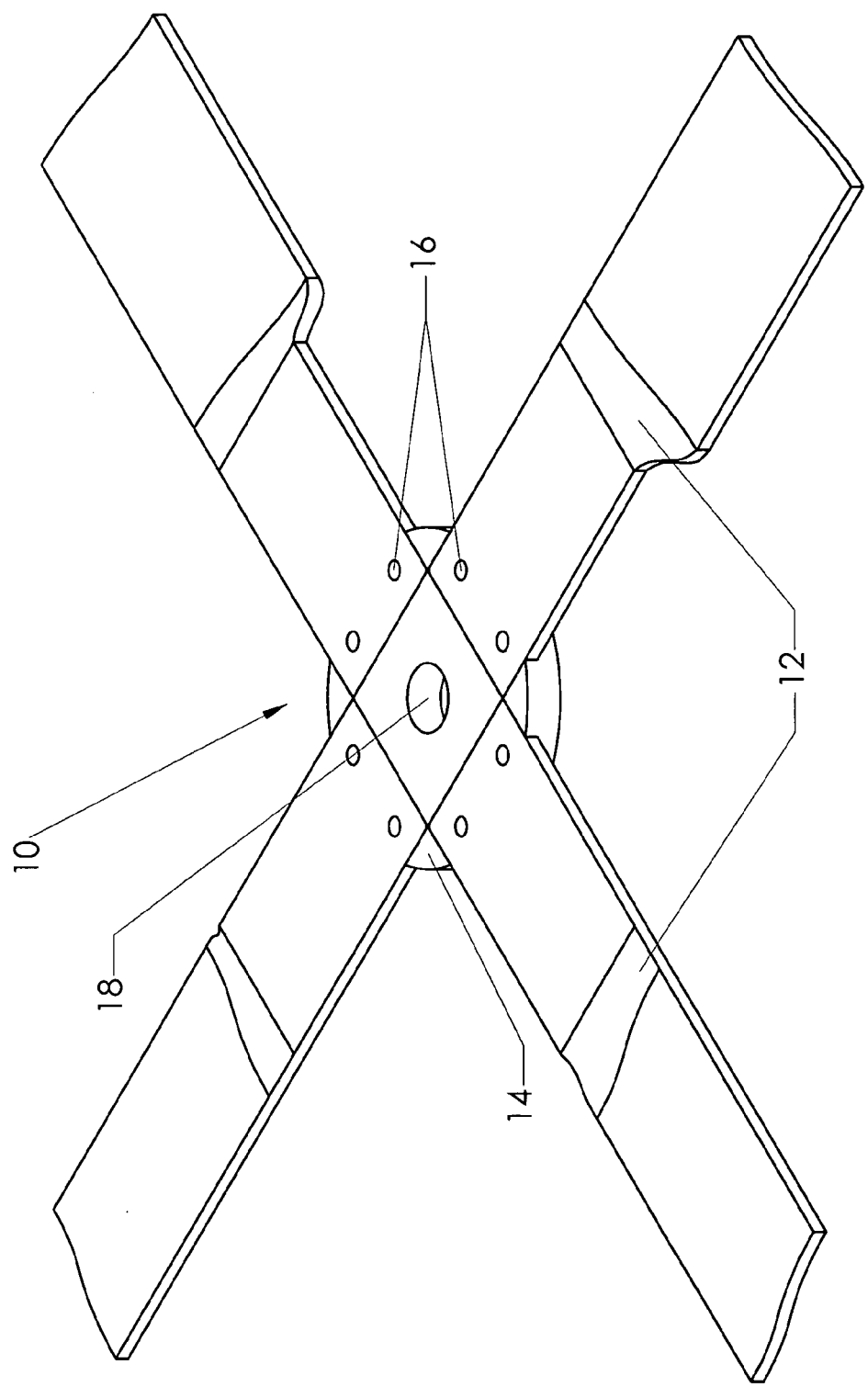
FIG. 1 is a plan view, showing the present invention.

The present invention is shown in its entirety in FIG. 1. Modularized lawnmower blade 10 is generally composed of a number of cutting blades 12 (in this example, four) attached to mounting hub 14. In FIG. 1, four cutting blades 12 are illustrated at right-angled orientation with respect to each other as this arrangement represents the preferred embodiment of the invention. This configuration is believed to provide superior cutting in comparison to a single blade with two cutting edges. This is partly because the resistance provided by the lawn is spread out across twice as many cutting blades. In addition, each blade cuts approximately half as much grass as in the standard single blade mower, thus slowing the blade wear. More or fewer cutting blades 12 can be used, however, without departing from the scope or spirit of the present invention.

Mounting hub 14 has mounting bore 18 which passes from the top (side shown) to the bottom of mounting hub 14. Mounting bore 18 is used to attach modularized lawnmower blade 10 to the shaft of a rotary lawnmower. Mounting bore 18 can be modified to suit all kinds of attachment features on various motor shafts. Cutting blades 12 are attached to mounting hub 14 with bolts 16.

Figure 2:
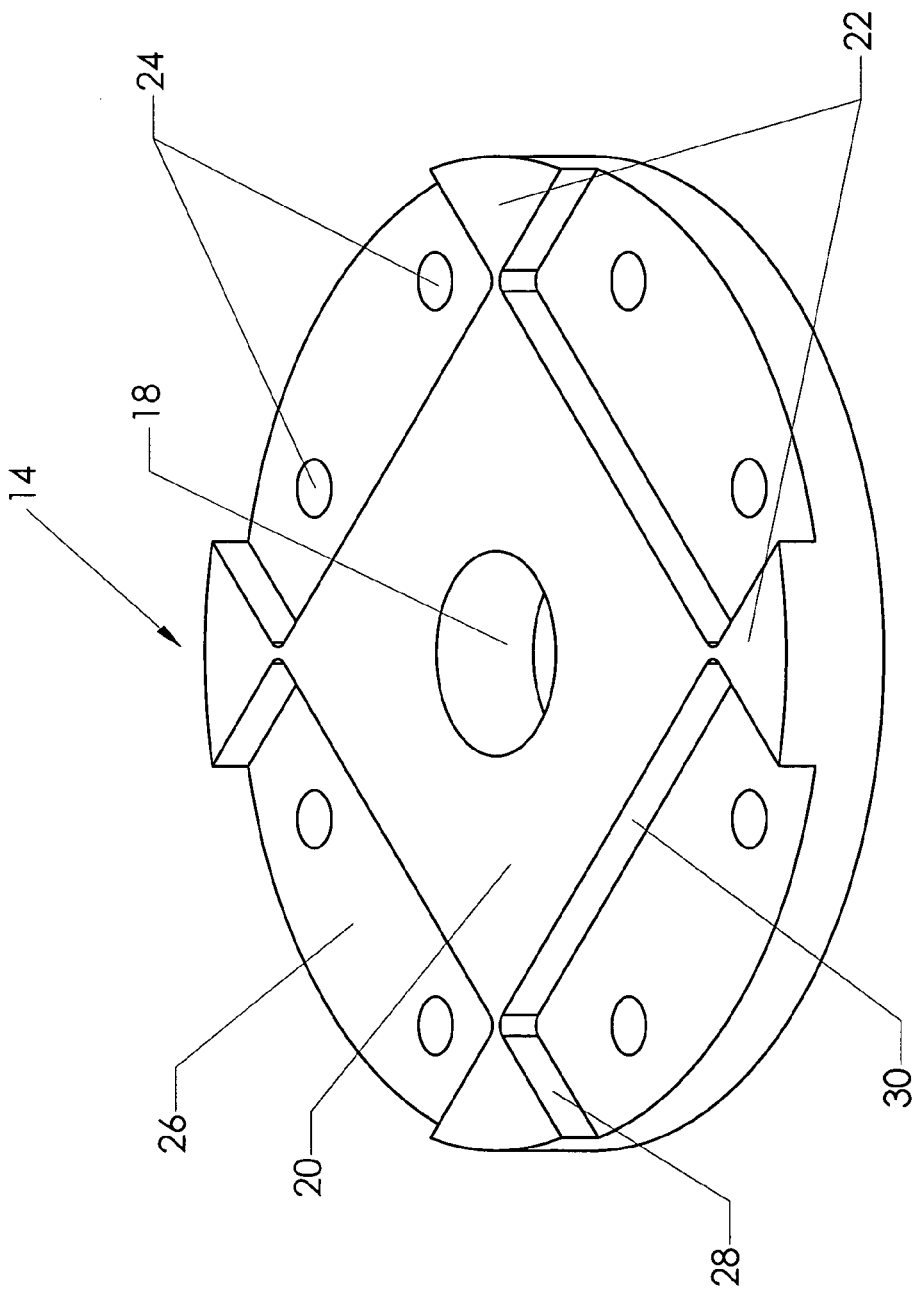
FIG. 2 is a perspective view, showing a mounting hub.

The various components of mounting hub 14 are illustrated in FIG. 2. Mounting hub 14 is preferably made of a strong metal alloy, such as steel. Mounting hub 14 has four recessed seats 26. Mounting hub 14 can also be provided with more or fewer recessed seats 26 depending on the number of blades that will be attached to mounting hub 14. Each recessed seat 26 has bolt holes 24 for attachment to cutting blade 12. Recessed seats 26 are formed by cutting out or milling the top of mounting hub 14 to form center portion 20 with corner wedges 22 at each of the corners of center portion 20 as shown. Each recessed seat 26 has a pair of side mating edges 28 where recessed seat 26 is bordered by corner wedge 22. Each recessed seat 26 also has back mating edge 30 where recessed seat 26 is bordered by center portion 20. Side mating edges 28 and back mating edge 30 serve to stabilize cutting blade 12 and prevent cutting blade 12 from shearing bolts 16 as will be described subsequently.

Figure 3:
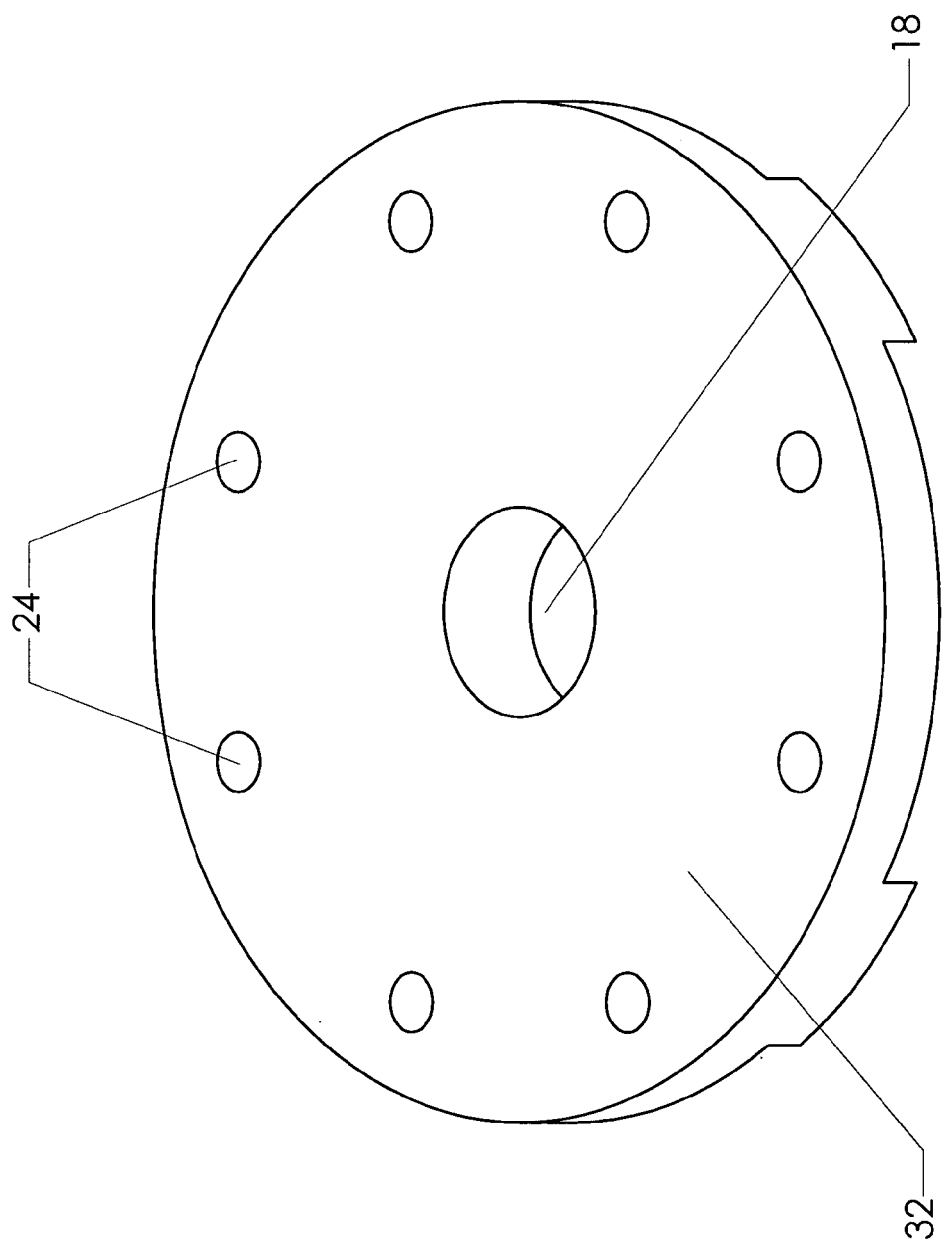
FIG. 3 is a perspective view, showing a mounting hub.

Mounting hub 14 is shown from the other side in FIG. 3. In the preferred embodiment bottom 32 is simply a flat surface except for bolt holes 24 and mounting bore 18. In the preferred embodiment bottom 32 faces the ground, but bottom 32 could also be installed facing the top of the housing of the lawnmower.

Figure 4:
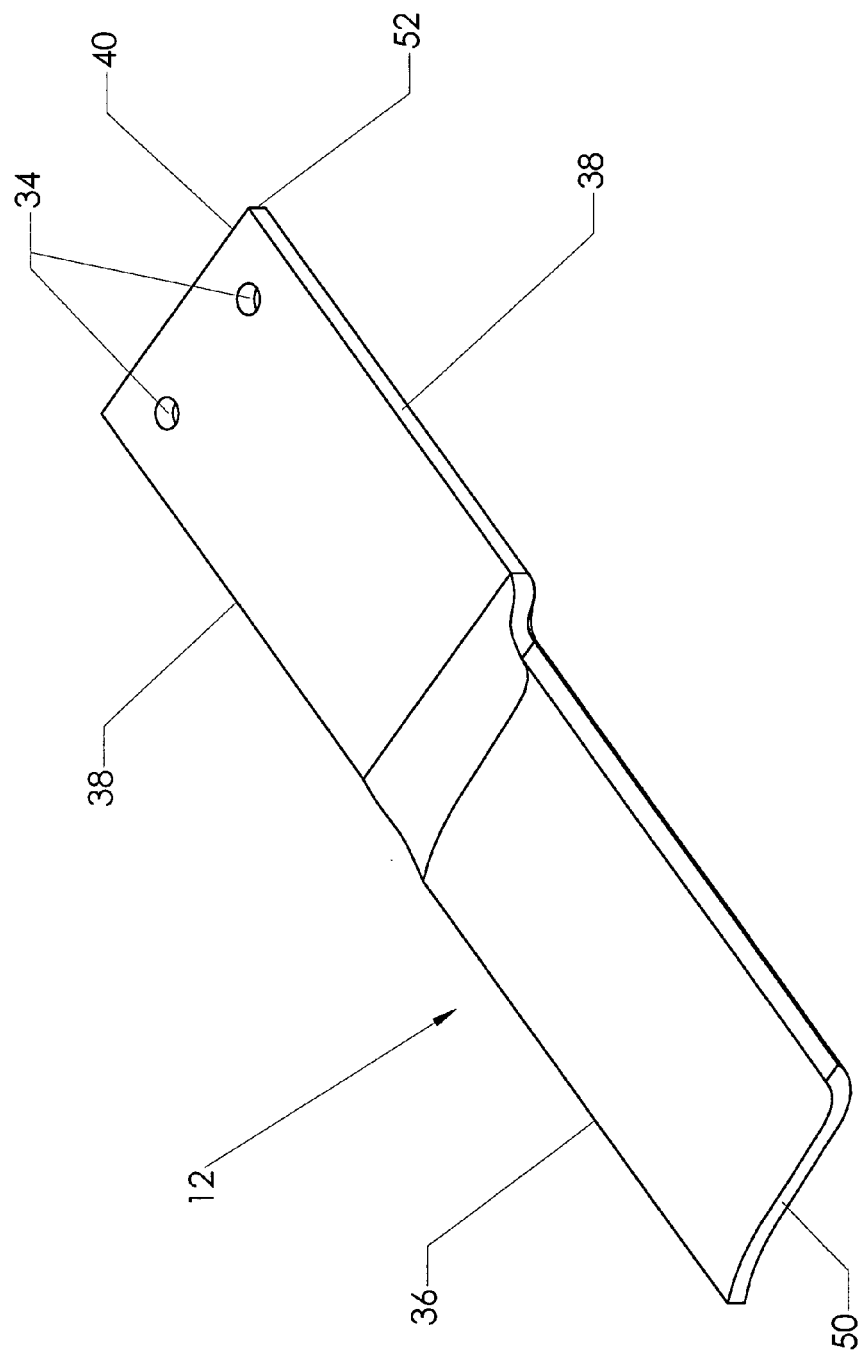
FIG. 4 is a perspective view, showing a mounting hub.

An example of cutting blade 12 is illustrated in FIG. 4. Cutting blade 12 generally has attaching end 52 and cutting end 50. Cutting blade 12 has cutting edge 36 on cutting end 50. Many types and shapes of cutting edges are known in the prior art and can be used as cutting edge 36. Attaching end 52 has bolt holes 34 which align with bolt holes 24 when the cutting blade is placed in recessed seat 26. Cutting blade 12 also has a pair of side edges 38 and back edge 40 on attaching end 52. When cutting blade 12 is attached to mounting hub 14, back edge 40 mates with back mating edge 30 and side edges 38 mate with side mating edges 28. This feature helps prevent the rotation of cutting blade 12 with respect to mounting hub 14 and ensures that cutting blades 12 are maintained in their designed orientation. In the preferred embodiment, this feature ensures that the cutting blades remain at a right-angled orientation with respect to each other. This feature also helps limit the shear stress that is delivered to the bolts when cutting blade 12 strikes a rock or other hard object.

Figure 5:
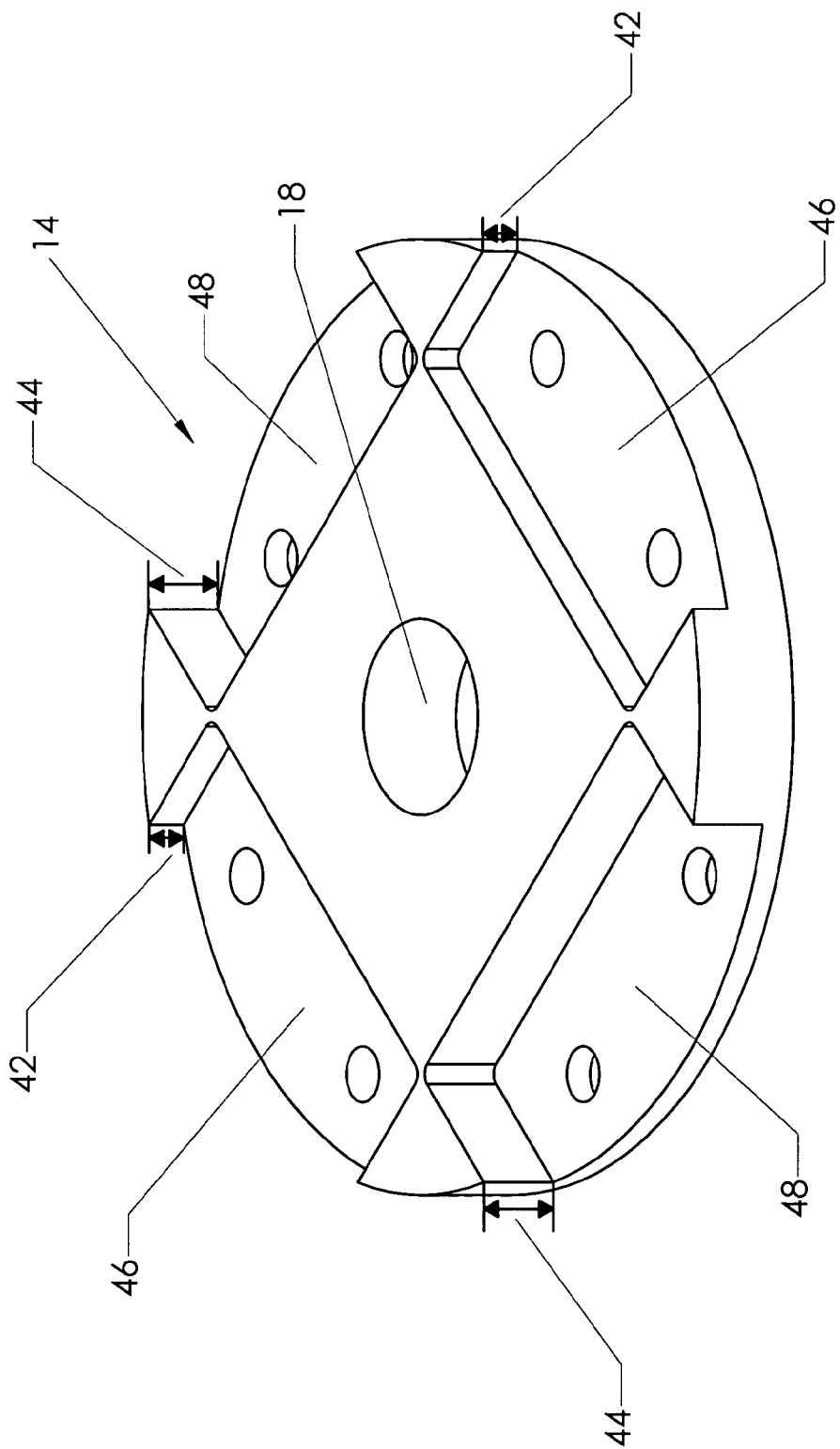
FIG. 5 is a perspective view, showing an alternate embodiment of the present invention.

An alternate embodiment of the present invention is shown in FIG. 5. Mounting hub 14 has a pair of recessed seats 48 at a different vertical offset than pair of recessed seats 46. The viewer will appreciate that using larger offset 44 for recessed seats 48 and smaller offset 42 for recessed seats 46 results in the cutting blades being set at different heights from the ground. In this configuration, two blades effectively "precut" taller grass before it is cut by the other two blades to the final desired height. This helps prevent taller blades of grass from folding over the cutting blade and being torn away instead of being cut.

Figure 6:
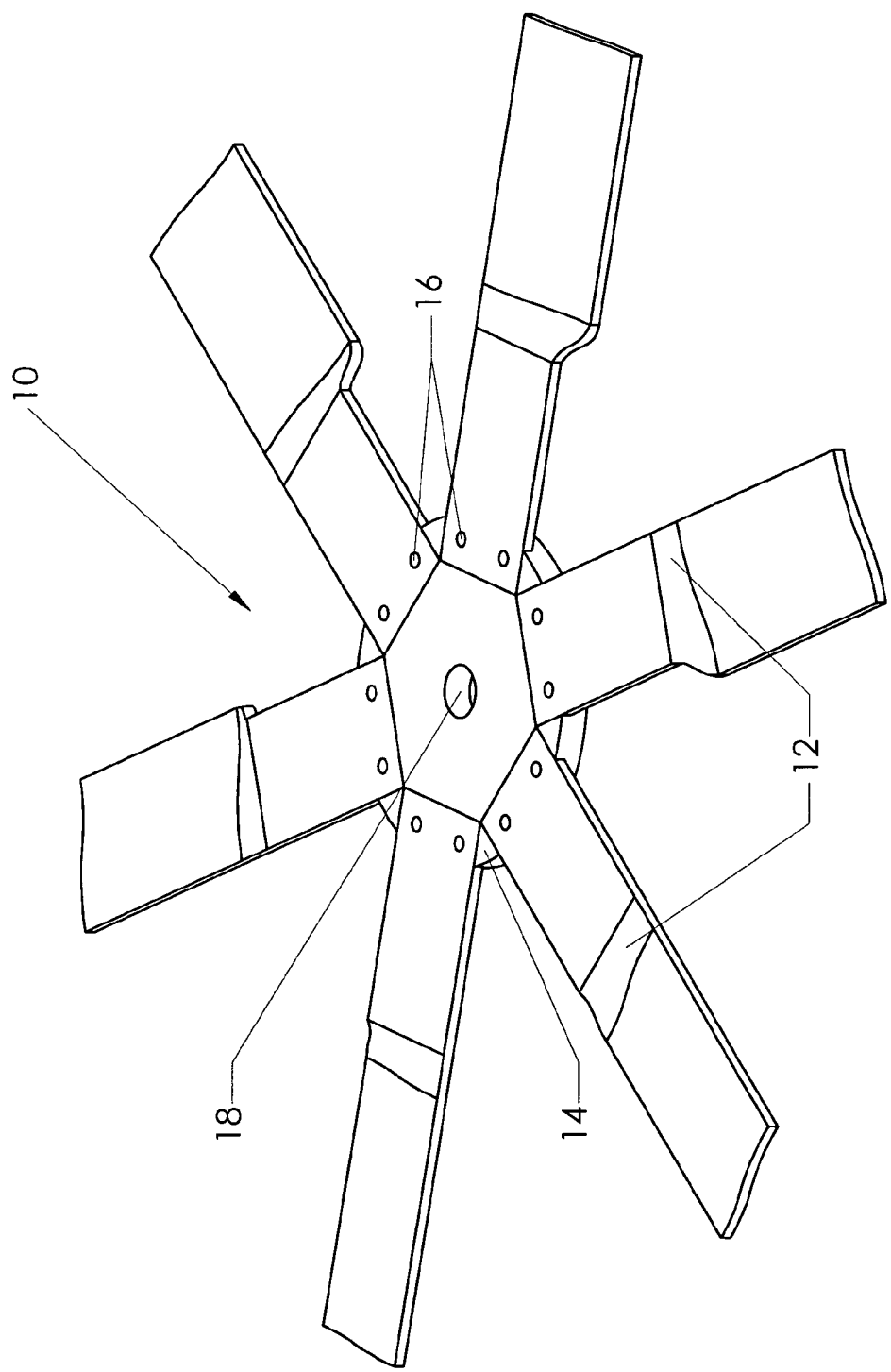
FIG. 6 is a perspective view, showing an alternate embodiment of the present invention.

The preceding description contains significant detail regarding the novel aspects of the present invention. It should not be construed, however, as limiting the scope of the invention but rather as providing illustrations of the preferred embodiments of the invention. As an example, different quantities, types, and configuration of cutting blades 12 can be used. As shown in FIG. 6, different numbers of cutting blades can be used (in this example, six). Such variations do not alter the function of the invention. Thus, the scope of the invention should be fixed by the following claims, rather than by the examples given.

Having described my invention, I claim:

1. A modularized replacement blade for a lawnmower comprising:
   a. a mounting hub, having a top, a bottom, a center and a perimeter, said mounting hub including
      i. a center portion situated on said top of said mounting hub, said center portion proximal to said center of said mounting hub;
      ii. a mounting bore, said mounting bore opening through said center portion and passing from said top of said mounting hub to said bottom of said mounting hub;
      iii. a first recessed seat, having a left side, a right side, a back side, and a vertical offset from said top of said mounting hub, said first recessed seat positioned proximal to said perimeter of said mounting hub;
      iv. a first corner wedge situated on said top of said mounting hub, said first corner wedge proximal to said perimeter of said mounting hub and positioned adjacent to said left side of said first recessed seat;
      v. a second corner wedge situated on top of said mounting hub, said second corner wedge proximal to said perimeter of said mounting hub and positioned adjacent to said right side of said first recessed seat;
      vi. a back mating edge formed between said center portion and said back side of said first recessed seat;
      vii. a first side mating edge formed between said first corner wedge and said left side of said first recessed seat;
      viii. a second side mating edge formed between said second corner wedge and said right side of said first recessed seat;
   b. a first cutting blade, having an attaching end and a cutting end, said cutting blade including
      i. a cutting edge positioned proximal to said cutting end of said cutting blade;
      ii. a first side edge positioned proximal to said attaching end of said cutting blade;
      iii. a second side edge positioned proximal to said attaching end of said cutting blade;
      iv. a back edge positioned proximal to said attaching end of said cutting blade; and
   c. wherein said first cutting blade is removably attached to said mounting hub so that said first side edge of said cutting blade mates with said first side mating edge of said mounting hub, said second side edge of said cutting blade mates with said second side mating edge of said mounting hub, and said back edge of said cutting blade mates with said back mating edge of said mounting hub.

2. The modularized replacement blade of claim 1, said mounting hub further comprising a second recessed seat, said second recessed seat having a vertical offset from said top of said mounting hub and positioned proximal to said perimeter of said mounting hub.

3. The modularized replacement blade of claim 2, said mounting hub further comprising a third recessed seat, said third recessed seat having a vertical offset from said top of said mounting hub and positioned proximal to said perimeter of said mounting hub.

4. The modularized replacement blade of claim 3, said mounting hub further comprising a fourth recessed seat, said fourth recessed seat having a vertical offset from said top of said mounting hub and positioned proximal to said perimeter of said mounting hub.

5. The modularized replacement blade of claim 2, wherein said vertical offset of said second recessed seat is greater than the said vertical offset of said first recessed seat.

6. The modularized replacement blade of claim 3, wherein said vertical offset of said second recessed seat is greater than the said vertical offset of said first recessed seat.

7. The modularized replacement blade of claim 4, wherein said vertical offset of said second recessed seat is greater than the said vertical offset of said first recessed seat.

8. A modularized replacement blade for a lawnmower comprising:
   a. a mounting hub, having a top, a bottom, a center, and a perimeter, including
      i. a mounting bore, said mounting bore proximal to said center of said mounting hub and passing from said top of said mounting hub to said bottom of said mounting hub;
      ii. a first recessed seat, having a first side mating edge, a second side mating edge, a back mating edge, and a vertical offset from said top of said top of said mounting hub, said first recessed seat positioned proximal to said perimeter of said mounting hub;
      iii. a second recessed seat, having a first side mating edge, a second side mating edge, a back mating edge, and a vertical offset from said top of said top of said mounting hub, said second recessed seat positioned proximal to said perimeter of said mounting hub;
   b. a first cutting blade, having an attaching end and a cutting end, including
      i. a cutting edge positioned proximal to said cutting end of said cutting blade;
      ii. a first side edge positioned proximal to said attaching end of said cutting blade;
      iii. a second side edge positioned proximal to said attaching end of said cutting blade;
      iv. a back edge positioned proximal to said attaching end of said cutting blade; and
   c. wherein said first cutting blade is removably attached to said mounting hub so that said first side edge of said cutting blade mates with said first side mating edge of said mounting hub, said second side edge of said cutting blade mates with said second side mating edge of said mounting hub, and said back edge of said cutting blade mates with said back mating edge of said mounting hub.

9. The modularized replacement blade of claim 8, said mounting hub further comprising a third recessed seat, having a first side mating edge, a second side mating edge, a back mating edge, and a vertical offset from said top of said top of said mounting hub, said third recessed seat positioned proximal to said perimeter of said mounting hub.

10. The modularized replacement blade of claim 9, said mounting hub further comprising a fourth recessed seat, having a first side mating edge, a second side mating edge, a back mating edge, and a vertical offset from said top of said top of said mounting hub, said fourth recessed seat positioned proximal to said perimeter of said mounting hub.

11. The modularized replacement blade of claim 8, wherein said vertical offset of said second recessed seat is greater than the said vertical offset of said first recessed seat.

12. The modularized replacement blade of claim 9, wherein said vertical offset of said second recessed seat is greater than the said vertical offset of said first recessed seat.

13. The modularized replacement blade of claim 10, wherein said vertical offset of said second recessed seat is greater than the said vertical offset of said first recessed seat.

* * * * *